United States Patent [19]

Hasegawa

[11] Patent Number: 5,594,528
[45] Date of Patent: Jan. 14, 1997

[54] FLASH BULB TYPE THERMAL COPYING DEVICE

[75] Inventor: Takanori Hasegawa, Tokyo-to, Japan

[73] Assignee: Riso Kagaku Corporation, Tokyo-to, Japan

[21] Appl. No.: 273,718

[22] Filed: Jul. 12, 1994

[30] Foreign Application Priority Data

Jul. 16, 1993 [JP] Japan .................................. 5-176966

[51] Int. Cl.⁶ .................................................. G03B 27/04
[52] U.S. Cl. .............................................. 355/84; 355/75
[58] Field of Search ................................... 355/75, 84, 85

[56] References Cited

U.S. PATENT DOCUMENTS

| | | | |
|---|---|---|---|
| 4,235,431 | 11/1980 | Abrams et al. | 355/75 |
| 4,545,674 | 10/1985 | Ishitate et al. | 355/75 |
| 4,550,660 | 11/1985 | Sato . | |
| 4,987,445 | 1/1991 | Burgess et al. . | |
| 5,138,943 | 8/1992 | Kikuchi | 101/115 |
| 5,390,001 | 2/1995 | Ishiwata et al. | 355/85 |

*Primary Examiner*—Howard B. Blankenship
*Assistant Examiner*—D. P. Malley
*Attorney, Agent, or Firm*—Dickstein Shapiro Morin & Oshinsky LLP

[57] ABSTRACT

Provided is a flash bulb type thermal copying device which allows divided exposure to be carried out in a simple but highly efficient manner. The thermal copying device comprises an exposure unit 10 having a light radiating window 22, and a flash light source 24 for radiating flash light upon the light radiating window 22, a planar holder 50, detachably mounted on the exposure unit 10, carrying an assembly of an original and a heat sensitive recording medium placed one over the other in an intimate thermal contact, and moveable across the light radiating window 22 with a light transmitting region provided on one side thereof aligned with the light radiating window 22, and a feed drive device 30 and 86 for moving the holder 50 and the exposure unit 10 relative to each other across the light radiating window 22. The holder can also be used as a stencil printing device to increases its acceptability for home use.

7 Claims, 4 Drawing Sheets

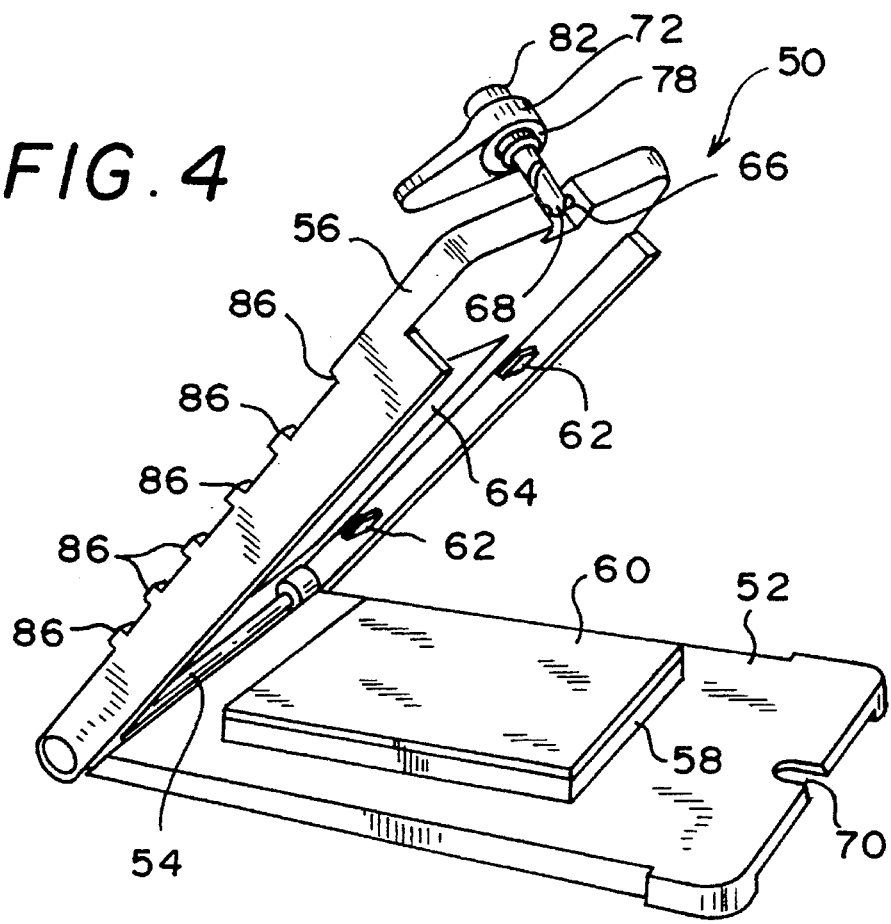
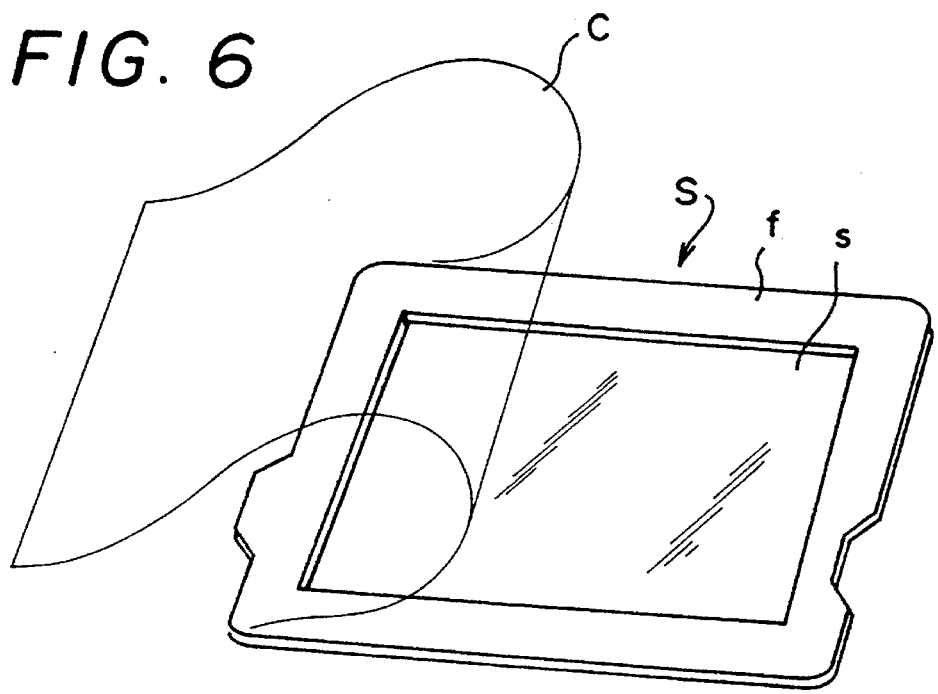

FLASH BULB TYPE THERMAL COPYING DEVICE

TECHNICAL FIELD

The present invention relates to a flash bulb type thermal copying device, and in particular to a flash bulb type thermal copying device which is suitable for preparing master plates for thermal stencil printing, and processing heat sensitive projection sheets or transparencies for overhead projectors (OHP).

BACKGROUND OF THE INVENTION

A flash bulb type thermal copying device uses a flash light source typically consisting of a xenon discharge bulb, and the flash light produced by the flash light source is radiated upon an assembly of an original and a heat sensitive recording medium which are placed closely one over the other so that the temperature variations corresponding to the original image may reproduce an identical image in the heat sensitive recording medium.

The heat sensitive recording media normally used in such a flash bulb type thermal copying device typically consist of heat sensitive stencil printing master plate sheets, or heat sensitive projection transparencies for OHP, and the flash bulb type thermal copying device is often used as a plate making device for a stencil printing device, or a device for preparing projection transparencies for OHP.

As a flash bulb type thermal copying device which processes a heat sensitive sheet having a large area by using a small number of flash light sources or a flash light source of a limited intensity, there is known the flash bulb type thermal copying device of the divided exposure type, for instance the one disclosed in Japanese patent laid open publication No. 60-161150 in which a laminated assembly consisting of an original sheet and a heat sensitive recording medium laid one over the other, and a light radiating surface unit including a flash light source are incrementally moved relative to each other by a certain pitch. The flash light source is activated every time the two parts are moved relatively to each other by the prescribed pitch.

In a thermal copying process, it is necessary for the original and the heat sensitive recording medium to be in a thermally close contact with each other during the entire exposure process. In the case of the divided exposure process described above, the original and the heat sensitive medium must stay stationary with respect to each other until the original is entirely copied.

Therefore, according to the conventional flash bulb type thermal copying device, the original and the heat sensitive recording medium are placed in a stationary position, one over the other in close contact by using negative pressure or the like, and the light source is moved relative to this laminated assembly. Alternatively, a base sheet is provided on one side of the heat sensitive recording medium so that the original may be interposed between the base sheet and the heat sensitive recording medium, and the heat sensitive recording medium may be moved relative to the light source along with the base sheet. In this case, a pressure mechanism is required to press the heat sensitive recording medium and the base sheet against each other at the position for exposure by the light source.

However, according to the method of placing the original and the heat sensitive recording medium one over the other in an intimate contact at a stationary position by using negative pressure, and moving a light source relative to this laminated assembly, it is necessary to use relatively large units for placing the original and the heat sensitive recording medium one over the other in an intimate contact, and for moving the light source. Thus, a system based on this method is highly unsuitable for simple flash bulb type thermal copying devices intended for use in homes.

According to the method of moving the laminated assembly consisting of the original and the heat sensitive recording medium, a sufficient reliability may not be attained with regard to the securement of the original and the heat sensitive recording medium relative to each other during each process of exposure. Furthermore, a pressure mechanism is needed for pressing the original and the heat sensitive recording medium against each other for each process of exposure, and the system cannot be made so simple as desired.

BRIEF SUMMARY OF THE INVENTION

In view of such problems of the prior art, a primary object of the present invention is to provide a flash bulb type thermal copying device which allows divided exposure to be carried out in a simple but efficient manner.

A second object of the present invention is to provide a flash bulb type thermal copying device which can be used also as a stencil printing device.

A third object of the present invention is to provide a flash bulb type thermal copying device which allows divided exposure to be carried out without requiring any powered actuator.

A fourth object of the present invention is to provide a flash bulb type thermal copying device which allows divided exposure to be carried out while keeping a heat sensitive recording medium and an original in a mutually fixed relationship throughout the process of divided exposure.

These and other objects of the present invention can be accomplished by providing a flash bulb type thermal copying device, comprising: a holder for holding therein an assembly consisting of an original and a heat sensitive recording medium one over the other in an intimate contact with each other, the holder including a light transmitting region defined therein for exposing the assembly to external light; an exposure unit including a casing, a holder receiving passage defined in the casing for guiding the holder along a first direction relative to the exposure unit, a light radiating window defined in the casing so as to scan the light transmitting region of the holder as the holder is moved along the first direction relative to the exposure unit, and a flash light source for radiating flash light upon the light transmitting region through the light radiating window; feed means for moving the holder relative to the exposure unit along the holder receiving passage so as to cause the light radiating window to scan the light transmitting region of the holder; and synchronization means for synchronizing activation of the flash light source with the feed means so as to expose the light transmitting region to the flash light emitted from the light radiating window.

According to this structure, the original and the heat sensitive recording medium are held one over the other in an intimate contact by the holder, and the laminated assembly, along with the holder, can be moved across the light radiating window of the exposure unit for a divided exposure process. Typically, the holder consists of a planar holder comprising a planar holder main body, an original supporting table provided on a major surface of the planar holder main body, a heat sensitive recording medium retaining plate having the light transmitting region defined therein and hinged to the holder main body along an edge thereof so as to allow the light transmitting region to be aligned with an original supported by the original supporting table.

If desired, this holder may also be used in a pressure type stencil printing device. To this end, the holder is adapted in such a manner that printing paper, instead of an original, may be placed on the original supporting table, printing ink may be deposited on the heat sensitive recording medium serving as a stencil master plate so that a desired stencil printing may be effected by pressing the stencil master plate against the printing paper.

Preferably, the holder receiving passage is inclined relative to a horizontal plane by an angle which is sufficient to cause the holder to drop through the holder receiving passage under the gravitational force, and the feed means is provided with a plurality of engagement portions arranged in the holder along the first direction at a prescribed interval, an engagement claw provided on the exposure unit for selectively preventing a dropping movement of the holder by selective engagement with the engagement portions, and drive means for selectively actuating the engagement claw.

Thus, because the direction of the relative feeding action between the holder and the exposure unit is vertically slanted, the feeding of the holder can be accomplished under action of the gravity without requiring any powered actuator. This dropping movement under the action of gravity can be effected in an intermittent manner by selectively engaging the engagement claw provided on the exposure unit with the engagement portions provided on the holder.

The actuator for the engagement claw may consist of a solenoid device. In this case, preferably, the solenoid device releases the engagement claw when energized, and is connected to the discharge circuit of the flash light source so that the intermittent dropping of the holder can be accurately synchronized with the flashing of the flashing light source through an appropriate electric circuit design without requiring any special synchronizing device.

BRIEF DESCRIPTION OF THE DRAWINGS

Now the present invention is described in the following with reference to the appended drawings, in which:

FIG. 4 is a perspective view of the overall structure of the holder used in the flash bulb type thermal copying device according to the present invention;

FIG. 6 is a perspective view of an example of the stencil master plate sheet holder assembly used in the flash bulb type thermal copying device according to the present invention.

DETAILED DESCRIPTION OF THE PREFERRED EMBODIMENTS

FIGS. 1 through 5 show an embodiment of the flash bulb type thermal copying device according to the present invention. This flash bulb type thermal copying device consists of an exposure unit 10 and a holder 50.

Figure 1:
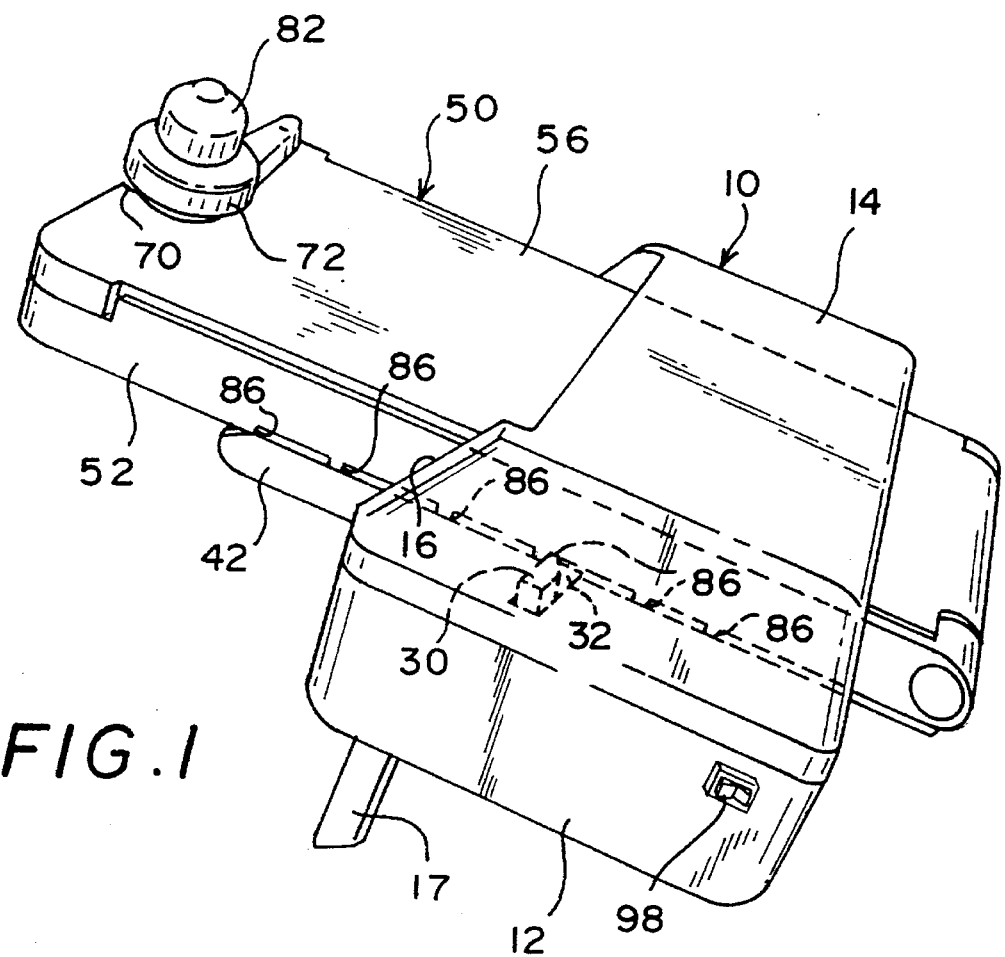
FIG. 1 is a perspective view of the overall structure of the flash bulb type thermal copying device according to the present invention.
Figure 3:
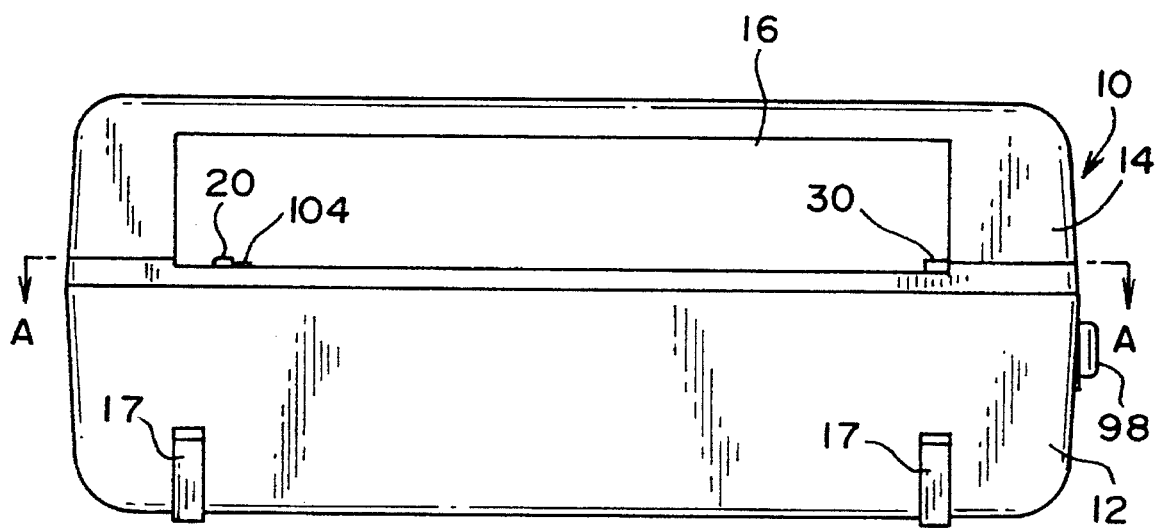
FIG. 3 is a front view of the exposure unit used in the flash bulb type thermal copying device according to the present invention.

The exposure unit 10 includes an assembly of a bottom case 12 and an upper case 14, and the bottom case 12 and the upper case 14 jointly define a holder receiving passage 16 for detachably receiving the holder 50 therein. The bottom case 12 is provided with a pair of foldable legs 17 which allow the exposure unit 10 to be held in a slanted orientation as illustrated in FIG. 1. By virtue of this slanted arrangement of the exposure unit 10, the holder receiving passage 16 is also placed in a slanted orientation.

The bottom surface of the holder receiving passage 16 is defined by an upper surface 18 of the bottom case 12, and this upper surface is provided with a holder guide rail 20 having a substantially rectangular cross section extending along the lengthwise direction of the holder receiving passage 16 on one side thereof. The holder receiving passage 16 is centrally provided with a rectangular light radiating window 22.

The bottom case 12 accommodates therein a flash light source 24 such as a xenon discharge lamp in a fixed manner for projecting a flash light beam through the light radiating window 22.

A stopper lever 28 is pivotally mounted in the bottom case 12 via a pivot shaft 26. One end of the stopper lever 28 is integrally formed with a barb-shaped engagement claw 30 located adjacent to a side of the holder receiving passage 16 through an opening 32 provided in the upper surface 18. The stopper lever 28 is urged by the spring force of a spring 34 in clockwise direction as seen in FIG. 2 or in the direction to engage the engagement claw 30 with engagement portions 86 of the holder 50 as described hereinafter.

The other end of the stopper lever 28 is drivingly connected to a plunger 38 of a solenoid device 36 fixedly arranged in the bottom case 12. When a coil 40 of the solenoid device 36 is energized, the solenoid device 36 magnetically attracts the plunger 38 in the leftward direction as seen in FIG. 2 to move the stopper lever 28 in counter clockwise direction as seen in FIG. 2 or in the direction to release the engagement claw 30 from the engagement portions 86 of the holder 50 against the spring force of the spring 34.

Figure 2:
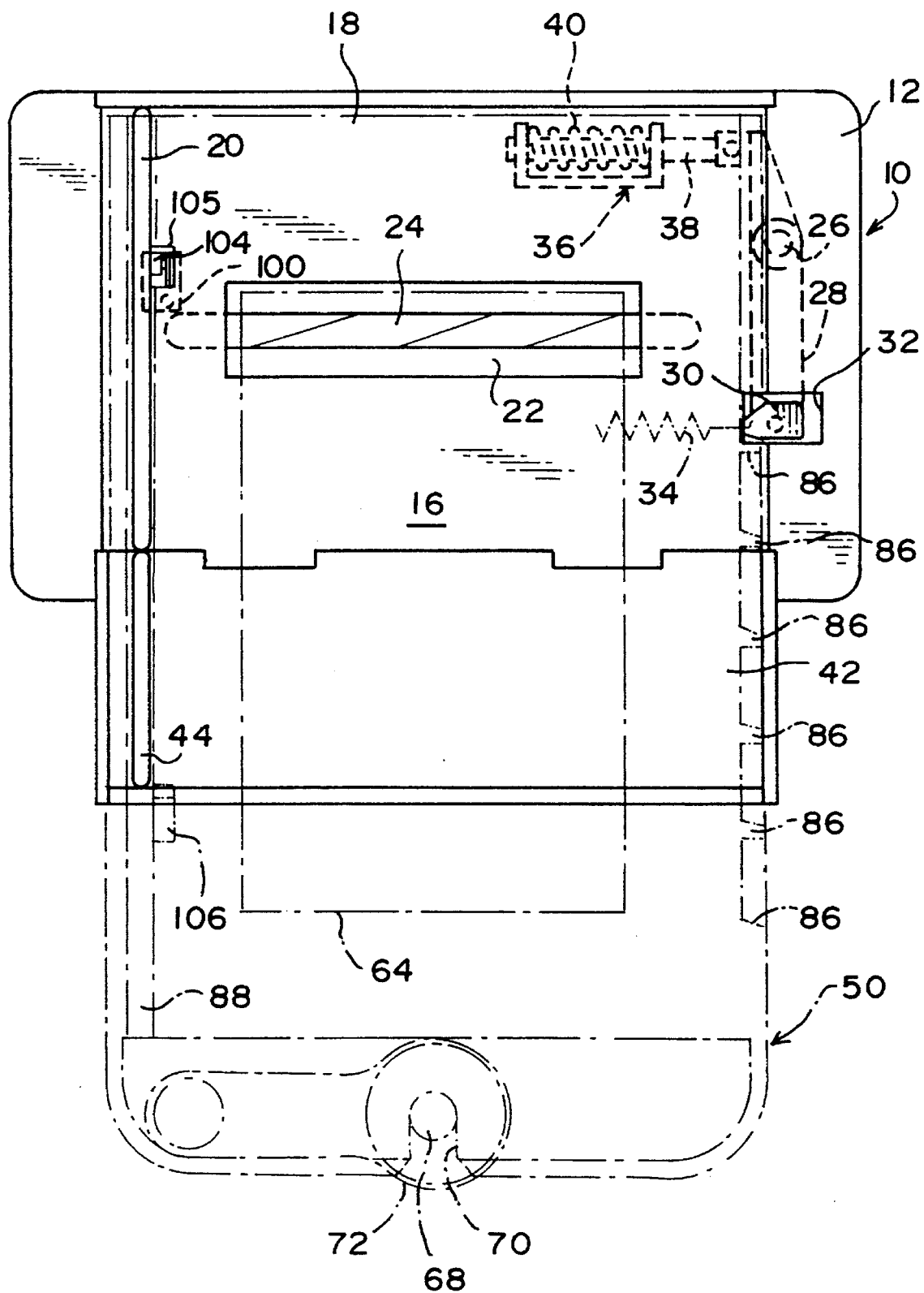
FIG. 2 is a plan view (as seen in the direction indicated by arrow A in FIG. 3) of an essential part of the exposure unit used in the flash bulb type thermal copying device according to the present invention.
Figure 5:
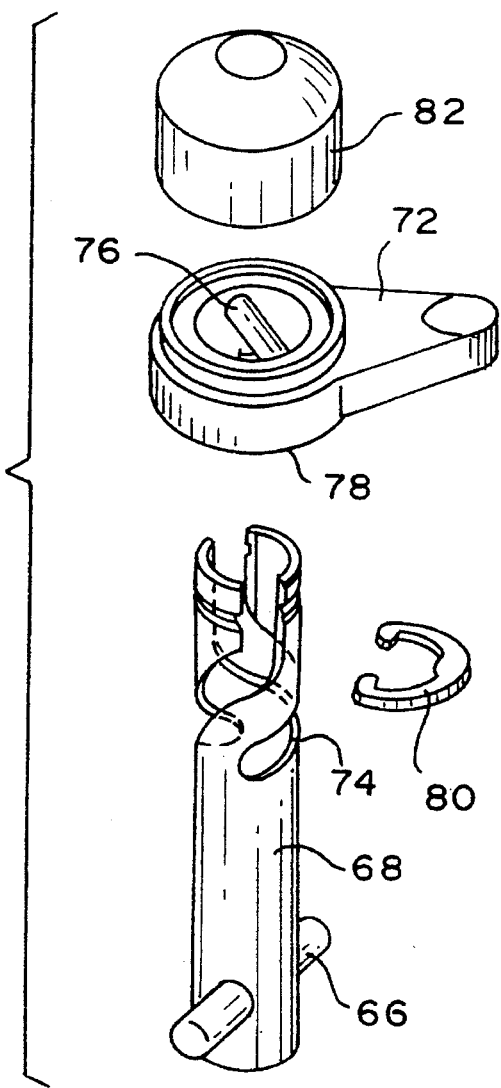
FIG. 5 is an exploded perspective view of the clamp mechanism of the holder used in the flash bulb type thermal copying device according to the present invention.

The exposure unit 10 is provided with a holder inserting tray 42 which is hinged to the upper end of the bottom surface of the holder receiving passage 16 or the upper surface 18 of the bottom case 12 serving both as a guide member for providing a support surface for the holder 50 particularly during the initial phase of the exposure process when it is deployed as illustrated in FIGS. 1 and 2, and as a lid for the holder receiving passage 16 when it is retracted in such a manner as to be opened and closed at will. The holder inserting tray 42 is provided with a guide rail extension 44 which aligns with the holder guide rail 20 along a common straight line when the holder inserting tray 42 is deployed.

The holder 50 for retaining a heat sensitive recording medium consists of a planar holder main body 52, and a retainer plate 56 hinged to the holder main body 52 at its one end via a pivot shaft 54, and the holder main body 52 and the retainer plate 56 can be placed one over the other as illustrated in FIG. 1 so that the entire assembly may be planar (book-shaped), and detachably received in the holder receiving passage 16 of the exposure unit 10 with the retainer plate 56 facing downward.

The surface of the holder main body 52 opposing the retainer plate 56 fixedly carries an original supporting table 58 consisting of resilient material such as foamed synthetic resin and covered by an adhesive sheet 60. The adhesive sheet 60 consists of sticky rubber material or sticky synthetic resin material such as polyurethane resin, and can detachably retain an original or a printing paper sheet thereon. For further details of the adhesive sheet 60, reference should be made to Japanese utility model laid open publication (kokai) No. 62-15725.

The surface of the retainer plate 56 facing the holder main body 52 is provided with retaining claws 62 for detachably retaining a heat sensitive recording medium such as a stencil master plate sheet holder assembly S illustrated in FIG. 6 at a position corresponding to the original supporting table 58.

The part of the surface of the retainer plate 56 corresponding to the stencil master plate sheet holder assembly S retained by the retaining claws 62 consists of a light transmitting region 64 made of transparent material. If desired, the retainer plate 56 may entirely consist of transparent plastic material including the light transmitting region 64.

The end of the retainer plate 56 opposite to the hinged end carries a clamp pipe 68 in a rotatable manner via a shaft 66, and the clamp pipe 68 can pivot around the shaft 66 until it is engaged by a U-shaped opening 70 provided along an end of the holder main body 52 opposite to the hinged end. A clamp knob 72 carrying a pin 76 is rotatably fitted onto the clamp pipe 68. The clamp pipe 68 is provided with spiral slots 74 which receive the pin 76 of the clamp knob 72.

The clamp knob 72 can be swung under the bottom surface of the clamp main body 52 as the clamp pipe 68 is rotated around the shaft 66 so as to oppose the bottom surface of the clamp main body 52 at a knob end surface 78. When the clamp knob 72 is rotated around the axial line of the clamp pipe 68, the clamp knob 72 is moved along the axial line of the clamp pipe 68 until the knob end surface 78 abuts the bottom surface of the clamp main body 52 for releasably closing the holder 50.

In this closed condition of the holder 50, the original placed on the adhesive sheet 60 of the holder main body 52 and the stencil master plate sheet holder assembly S retained on the retainer plate 56 by the retaining claws 62 are pressed against each other in an intimate contact. A stopper ring 80 is fitted on the clamp pipe 68 to define the upper limit of the moveable range of the clamp knob 72 along the clamp pipe 68, and a cover cap 82 is fitted on the clamp knob 72.

A plurality, six in the case of the illustrated embodiment, of engagement portions 86, consisting of projections in the illustrated embodiment, are arranged along one side of the retainer plate 56 in the direction of the feeding movement relative to the exposure unit 10 at a prescribed interval. These engagement portions 86 engage the engagement claw 30 when the holder 50 is fitted into the holder receiving passage 16 with the retainer plate 56 facing downward, and prevent the free fall of the holder 50.

The other side of the retainer plate 56 is provided with a guide groove 88 (refer to FIG. 2) for engaging the holder guide rail 20 and the guide rail extension 44.

Figure 7:
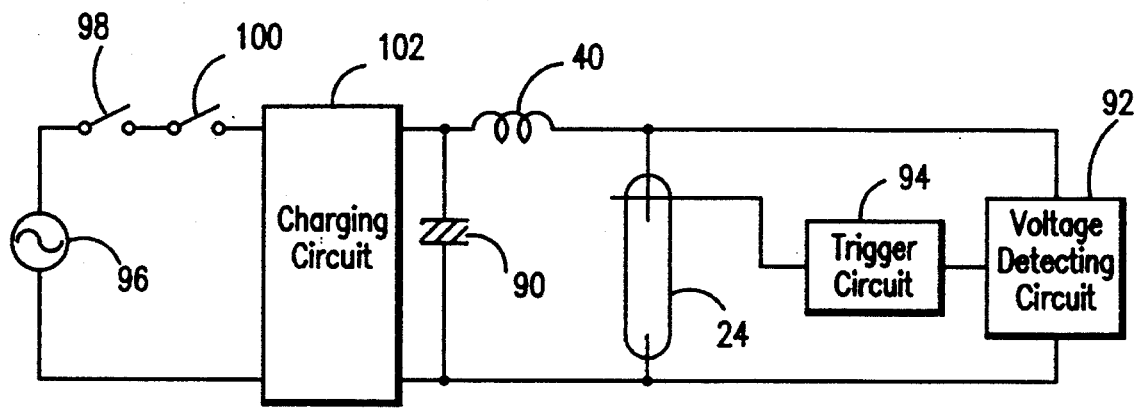
FIG. 7 is an electric circuit diagram of the exposure unit used in the flash bulb type thermal copying device according to the present invention.

FIG. 7 is an electric circuit diagram of the flash bulb type thermal copying device having the above described structure. The flash light source 24 is connected to a charging capacitor 90, and emits flash light when electric charge is passed through it by the charging capacitor 90.

The charging capacitor 90 receives a supply of electric current from an AC power source 96 via a main switch 98, a limit switch 100 and a voltage boosting charging circuit 102. The coil 40 of the solenoid device 36 is connected in series between the charging capacitor 90 and the flash light source 24.

The main switch 98 consists of a manually operated switch, and is mounted on the outer surface of the bottom case 12 as illustrated in FIG. 1 so as to be operated by the user.

A roller actuator 104 of the limit switch 100 projects into the holder receiving passage 16 via an opening 105, and is adapted to close the limit switch 100 by being pushed by the retainer plate 56 of the holder 50, and to be opened by being engaged by a recess 106 provided in the retainer plate 56 when the holder 50 has reached an end of the stroke toward the final feed position.

The stencil master plate sheet holder assembly S consists of a frame f, a heat sensitive stencil master plate sheet s, and a cover sheet c attached to the other side of the frame f so as to be opened and closed at will, as illustrated in FIG. 6. Printing ink having a certain viscosity is to be deposited between the stencil master plate sheet s and the cover sheet c. For more details of this heat sensitive stencil master plate sheet holder assembly S, reference should be made to Japanese utility model laid open publication (kokai) No. 51-132007.

Now the operation of the flash bulb type thermal copying device having the above described structure is described in the following.

First of all, the holder 50 is placed in the released condition as illustrated in FIG. 4, and after placing an original on the adhesive sheet 60 on the holder main body 52, the stencil master plate sheet holder assembly S is mounted on the retainer plate 56 by using the retaining claws 62.

Then, the retainer plate 56 is rotated toward the holder main body 52 around the pivot shaft 54 to close the holder 50. The clamp pipe 68 is turned around the shaft 66 to place the knob end surface 78 of the clamp knob 72 under the bottom surface of the holder main body 52 as seen in FIG. 4, and the clamp knob 72 is rotated around the axial line of the clamp pipe 68.

As a result, the clamp knob 72 is moved along the axial line of the clamp pipe 68 until the knob end surface 78 comes into contact with the bottom surface of the holder main body 52, and the holder 50 is secured in its closed condition with the holder main body 52 and the retainer plate 56 disposed in parallel with each other. This secured condition is a highly stable one owing to the structure of the clamp formed by the clamp knob 72 and the clamp pipe 68.

In this secured condition described above, the original placed on the adhesive sheet 60 of the holder main body 52 and the stencil master plate sheet holder assembly S retained on the retainer plate 56 by the retaining claws 62 are pressed against each other in an intimate contact.

Following this process of clamping, the holder 50 in its secured condition is placed on the holder insertion tray 42 of the exposure unit 10 with its hinged end first and the retainer plate 56 facing downward, and the holder 50 is allowed to drop into the holder receiving passage 16 with the guide groove 88 engaging the guide rail extension 44 and the holder guide rail 20.

At this time point, because the coil 40 is not energized and the engagement claw 30 is therefore at the position for engagement under the spring force of the spring 34, the first engagement portion (the engagement portion nearest to the hinged end) 86 engages the engagement claw 30 to thereby prevent any further downward movement of the holder 50. This defines the position for starting the process of exposure for the holder 50. In this position for starting the process of exposure, the side of the light transmitting region 64 adjacent to the hinged end aligns with the light radiation window 22 for the first exposure as illustrated in FIG. 2.

Once the holder 50 is thus placed inside the holder receiving passage 16, because the roller actuator 104 is pressed and the limit switch 100 is closed, provided that the main switch 98 is turned on, the charging capacitor 90 begins to be electrically charged. When the charging capacitor 90 is fully charged, and a trigger circuit 94 is activated by a charged voltage detecting circuit 92 detecting the charged voltage, the charging capacitor 90 applies a voltage across the flash light source 24, and a flash light is produced from the flash light source 24.

Thus, a first exposure process is carried out by the light radiated through the light radiating window 22 onto the assembly of the original and the stencil master plate sheet holder assembly S held together in an intimate contact by the holder 50 from the side of the stencil master plate sheet holder assembly S.

At this point, electric current is also supplied to the coil 40 so that the plunger 38 is instantaneously moved leftward as seen in FIG. 2, and the stopper lever 28 is rotated in counter clockwise direction as seen in FIG. 2 against the spring force of the spring 34. As a result, the engagement claw 30 is temporarily disengaged from the engagement portion 86 of the holder 50.

As soon as the flash light source 24 is activated, the holder 50 thus drops further inside the holder receiving passage 16 until the engagement claw 30 which has been restored to its position for engagement engages the second engagement portion 86, and the holder 50 is thus prevented from dropping further inside the holder receiving passage 16. In this manner, the holder 50 drops by the pitch of the engagement portions 86, and is positioned for the second exposure.

Each increment of this feeding movement corresponding to the pitch of the engagement portions 86 may be identical to the dimension of the light radiating window 22 along the direction of the feeding movement or slightly smaller than this dimension.

When the charging capacitor 90 is again fully charged, and the trigger circuit 94 is activated by the charging voltage detecting circuit 92 which has detected the fully charged condition of the charging capacitor 90, a discharge voltage is applied from the charging capacitor 90 across the flash light source 24, and a flash light is again produced from the flash light source 24.

Thus, a second exposure process is carried out by the light radiated through the light radiating window 22 onto the assembly of the original and the stencil master plate sheet holder assembly S held together in an intimate contact by the holder 50 from the side of the stencil master plate sheet holder assembly S.

Thereafter, the intermittent feeding action involving the exposure process and the free dropping movement of the holder 50 is repeated for a prescribed number of times. When the engagement claw 30 engages the last of the engagement portions 86, the recess 106 provided in the retainer plate 56 engages the roller actuator 104, and the limit switch 100 is opened so as to prevent any further charging of the charging capacitor 90 and complete the exposure processes.

Thus, a divided exposure process covering the entire area of the assembly of the original and the stencil printing master plate sheet holder assembly S held together in an intimate contact by the holder 50 is completed. When the exposure process or the thermal plate making process on this stencil master plate sheet holder assembly S is completed, the main switch 98 is turned off, and the holder 50 is pulled out of the holder inserting passage 16. Because the claw 30 is provided with such a barb that the engagement claw 30 can be readily disengaged from the engagement portions 86 as the movement of the holder 50 is reversed by hand, and the holder 50 can be readily pulled out of the holder inserting passage 16 even without energizing the coil 40.

Upon completion of this plate making process, the holder 50 can be used as a manually operated stencil printing device. In this case, the clamp knob 72 is turned and restored to its initial position and the holder 50 is released. The retainer plate 58 can thus be rotated with respect to the holder main body 52 around the pivot shaft 54 as illustrated in FIG. 4, and a printing paper sheet instead of an original is placed on the adhesive sheet 60 of the original supporting table 58 of the holder main body 52. The stencil master plate sheet holder assembly S is temporarily removed from the retainer plate 56, and with printing ink filled into the gap between the stencil master plate sheet s and the cover sheet c, the stencil master plate sheet holder assembly S is again mounted on the retainer plate 56.

Upon completion of this preparatory process, the retainer plate 56 is turned toward the holder main body 52 around the pivot shaft 54 by holding the clamp knob 72, and the stencil master plate sheet holder assembly S of the retainer plate 56 is pressed upon the printing paper placed on the adhesive sheet 60 of the original supporting table 58. Thus, a desired stencil printing is carried out on the printing paper according to the image given by the stencil master plate sheet holder assembly S.

In this pressure type stencil printing process, because the clamp knob 72 can rotate vertically with respect to the retainer plate 56 around the shaft 66, it can be used as a moveable grip which allows the rotative movement of the retainer plate 56 for application of pressure can be carried out by the user in a comfortable manner.

Although the feeding action of the holder was effected under the gravitational force in the above described embodiment, the flash bulb type thermal copying device of the present invention is not limited by this embodiment but the feeding movement of the holder may also be effected by rollers or the like rotatively driven by a motor or by hand inside the holder receiving passage 16 of the exposure unit 10. If the feeding action is effected by power means, the holder receiving passage is not required to be inclined.

If the feeding speed of the holder 50 is determined so that the displacement of the holder 50 between two succeeding activations of the flash light source 24 corresponds to the width covered by each exposure process, irrespective of whether the feeding of the holder is effected by the gravitational force or by power means, the holder 50 is not required to be fed in an intermittent manner but may be continually fed without involving any full stop while the flash light source 24 is activated at a prescribed interval.

The flash bulb type thermal copying device of the present invention can be constructed in such a manner that the holder is kept stationary while the exposure unit 10 is fed with respect to the holder 50. Also, the feeding movement of the holder is not limited to a linear movement, by may consist of rotary or other movements as long as a proper divided exposure is possible.

As can be understood from the above description, according to the flash bulb type thermal copying device of the present invention, because a divided exposure process is carried out by moving the assembly of the original and the stencil printing master plate sheet holder assembly held together in an intimate contact by the holder across the light radiating window of the exposure unit, the possibility of relative movement between the original and the heat sensitive recording medium can be totally eliminated, and a highly intimate thermal contact can be established with the result that a reliable, high-precision, and highly efficient flash bulb type thermal copying process can be carried out.

The holder can be used also as a pressure type stencil printing device without any modification.

According to the embodiment in which the relative feeding direction between the holder and the exposure unit is slanted vertically, and the engagement claw provided in the exposure unit selectively engages with the engagement portions of the holder, the intermittent feeding action of the holder can be accomplished under the gravitational force without requiring any special actuators, and the divided exposure process can be carried out without requiring any complex feeding mechanism.

Additionally, if the drive device for the engagement claw consists of a solenoid which drives the engagement claw in the direction for releasing the engagement claw when energized, and this solenoid is functionally connected to the power circuit for the flash light source, the intermittent dropping motion of the holder can be positively synchronized with the flashing of the flash light source without requiring any complex synchronization control system. Thus, the present invention provides a simple but highly efficient flash bulb type thermal copying device which is practical enough to be used in homes.

Although the present invention has been described in terms of a specific embodiment thereof, it is possible to modify and alter details thereof without departing from the spirit of the present invention.

What I claim is:

1. A flash bulb type thermal copying device, comprising:

a holder for holding therein an assembly consisting of an original and a heat sensitive recording medium one over the other in an intimate contact with each other, said holder including a light transmitting region defined therein for exposing said assembly to external light;

an exposure unit capable of making exposures of said assembly through said light transmitting region, said exposure unit including a casing, a holder receiving passage defined in said casing for guiding movement of said holder in a first direction relative to said exposure unit, a light radiating window defined in said casing so as to successively scan a plurality of portions of said light transmitting region of said holder while said holder and associated light transmitted region are moved in said first direction relative to said exposure unit, and a flash light source for radiating flash light upon said portions of said light transmitting region through said light radiating window;

a feeder mechanism for moving said holder relative to said exposure unit in said holder receiving passage so as to cause said light radiating window to successively scan said portions of said light transmitting region of said holder; and a synchronization electric circuit for synchronizing activation of said flash light source with said feeder mechanism so as to expose each of said portions of said light transmitting region to said flash light emitted from said light radiating window while said feeder mechanism moves said holder and associated light transmitting region through said exposure unit.

2. A flash bulb type thermal copying device according to claim 1, wherein said holder consists of a planar holder comprising a planar holder main body, an original supporting table provided on a major surface of said planar holder main body, a heat sensitive recording medium retaining plate having said light transmitting region defined therein and hinged to said holder main body along an edge thereof so as to allow said light transmitting region to be aligned with an original supported by said original supporting table.

3. A flash bulb type thermal copying device according to claim 2, wherein said holder is adapted to be used as a stencil printing device by placing printing paper, instead of an original, on said original supporting table, depositing printing ink on said heat sensitive recording medium serving as a stencil master plate, and pressing said stencil master plate against said printing paper.

4. A flash bulb type thermal copying device comprising:

a holder for holding therein an assembly consisting of an original and a heat sensitive recording medium one over the other in an intimate contact with each other, said holder including a light transmitting region defined therein for exposing said assembly to external light;

an exposure unit including a casing, a holder receiving passage defined in said casing for guiding movement of said holder in a first direction relative to said exposure unit, a light radiating window defined in said casing so as to scan said light transmitting region of said holder as said holder is moved in said first direction relative to said exposure unit, and a flash light source for radiating flash light upon said light transmitting region through said light radiating window;

a feeder mechanism for moving said holder relative to said exposure unit in said holder receiving passage so as to cause said light radiating window to scan said light transmitting region of said holder;

a synchronization electric circuit for synchronizing activation of said flash light source with said feeder mechanism so as to expose said light transmitting region to said flash light emitted from said light radiating window;

wherein said holder consists of a planar holder comprising a planar holder main body, an original supporting table provided on a major surface of said planar holder main body, a heat sensitive recording medium retaining plate having said light transmitting region defined therein and hinged to said holder main body along an edge thereof so as to allow said light transmitting region to be aligned with an original supported by said original supporting table; and wherein said holder receiving passage is inclined relative to a horizontal plane by an angle which is sufficient to cause said holder to drop through said holder receiving passage under gravitational force, and said feeder mechanism is provided with a plurality of engagement portions arranged in said holder along said first direction at a prescribed interval, an engagement claw provided on said exposure unit for selectively preventing a dropping movement of said holder by selective engagement with said engagement portions, and a drive mechanism for selectively actuating said engagement claw under control of said synchronizing electric circuit.

5. A flash bulb type thermal copying device according to claim 4, wherein said drive mechanism comprises spring means for urging said engagement claw into engagement with said engagement portions, and a solenoid device which actuates said engagement claw out of engagement with said engagement portions when energized, and said synchronization electric circuit comprises a electric discharge circuit which activates said flash light source in association with energization of said solenoid device.

6. A flash bulb type thermal copying device according to claim 5, wherein said exposure unit comprises a substantially rectangular box-shaped casing having said holder receiving passage defined substantially in parallel with a face thereof, and a foldable leg for supporting said casing at an angle relative to a flat supporting surface so as to dispose said holder receiving passage at said inclination angle relative to a horizontal plane.

7. A flash bulb type thermal copying device, comprising:

a holder for holding therein an assembly consisting of an original and a heat sensitive recording medium one over the other in an intimate contact with each other, said holder including a light transmitting region defined therein for exposing said assembly to external light;

an exposure unit capable of making exposures of said assembly through said light transmitting region, said exposure unit including a casing, a holder receiving passage defined in said casing for guiding movement of said holder in a first direction relative to said exposure unit, a light radiating window defined in said casing so as to scan a plurality of portions of said light transmitting region of said holder while said holder and associated light transmitted region are moved in said first direction relative to said exposure unit, and a flash light source for radiating flash light upon said portions of said light transmitting region through said light radiating window;

a feeder mechanism for moving said holder relative to said exposure unit in said holder receiving passage so as to cause said light radiating window to scan said portions of said light transmitting region of said holder; and a synchronization electric circuit for synchronizing activation of said flash light source with said feeder mechanism so as to expose each of said portions of said light transmitting region to said flash light emitted from said light radiating window while said feeder mechanism moves said holder and associated light transmitting region through said exposure unit.

* * * * *